United States Patent
Hemphill et al.

(10) Patent No.: US 9,896,018 B2
(45) Date of Patent: Feb. 20, 2018

(54) LOCKING CARGO TIE-DOWN

(71) Applicant: FORD GLOBAL TECHNOLOGIES, LLC, Dearborn, MI (US)

(72) Inventors: Joshua Robert Hemphill, White Lake, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 14/858,269

(22) Filed: Sep. 18, 2015

(65) Prior Publication Data

US 2017/0080844 A1    Mar. 23, 2017

(51) Int. Cl.
*B60P 7/08*    (2006.01)

(52) U.S. Cl.
CPC .................. *B60P 7/0807* (2013.01)

(58) Field of Classification Search
CPC   B60P 7/0807; B60P 3/07; B60P 3/122; B60P 3/40; B60P 7/0815
USPC ................. 410/106, 101, 110, 105, 107, 109
See application file for complete search history.

(56) References Cited

U.S. PATENT DOCUMENTS

| | | | |
|---|---|---|---|
| 5,774,948 A | 7/1998 | Petschke et al. | |
| 6,769,853 B2* | 8/2004 | Perrot | F16B 5/0628 296/191 |
| 6,905,098 B2 | 6/2005 | Tisol, Jr. | |
| 7,124,475 B2* | 10/2006 | Jeffries | E05B 1/0092 16/445 |
| 7,454,933 B1* | 11/2008 | Paige | E05B 1/0092 292/207 |
| 7,578,645 B2 | 8/2009 | Terry et al. | |
| 7,811,036 B2 | 10/2010 | Armour | |
| 8,393,838 B2* | 3/2013 | Plazek | B60P 7/0807 410/104 |
| 8,820,811 B1 | 9/2014 | Hemphill et al. | |
| 8,882,419 B2* | 11/2014 | Aguirre | B60P 7/0807 410/106 |
| 8,974,161 B1 | 3/2015 | Hemphill et al. | |
| 9,016,990 B2 | 4/2015 | Grone | |

* cited by examiner

*Primary Examiner* — D Glenn Dayoan
*Assistant Examiner* — Sunsurraye Westbrook
(74) *Attorney, Agent, or Firm* — Jason Rogers; Brooks Kushman P.C.

(57) ABSTRACT

A retaining apparatus includes a base member having a first protrusion engaging an edge of a fixed plate and a floating hinge connected to the base member. The retaining apparatus also includes a pivotable plate member pivotally connected to the hinge. The pivotable plate member also defines a second protrusion engaging an opposing edge of the fixed plate. The pivotable plate member actuates to clamp the fixed plate between the first protrusion and the second protrusion.

17 Claims, 3 Drawing Sheets

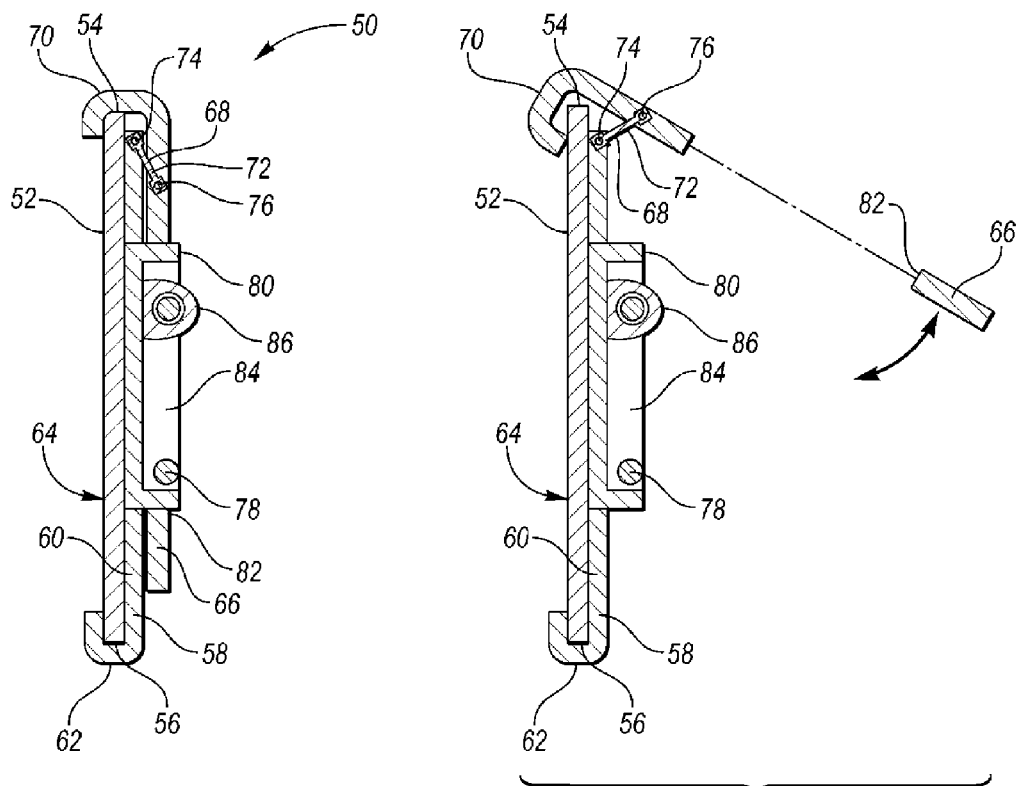
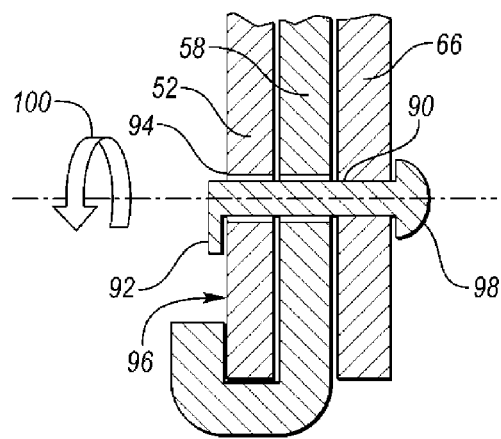
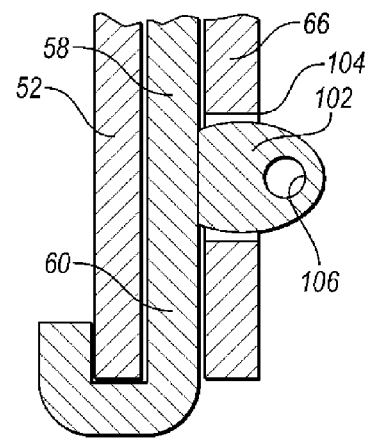

US 9,896,018 B2

LOCKING CARGO TIE-DOWN

TECHNICAL FIELD

The present disclosure relates to removable cargo tie-down structures for vehicle body systems.

BACKGROUND

Various vehicles include a cargo hold, or cargo bed, to transport cargo. The cargo beds may include tie down attachments for securing the cargo during transport. Tie down attachments may be permanently affixed to the cargo bed structure. Permanent attachments may be required to be secured with tools. Such permanent attachments can also be inflexible with respect to the locations available to tie down cargo. Additionally, tie-down attachments can interfere with cargo stored in the cargo bed that is not desired to be tied down using attachment.

This disclosure is directed to solving the above problems and other problems as summarized below.

SUMMARY

According to an aspect of this disclosure, a retaining apparatus is provided that includes a base member having a first protrusion engaging an edge of a fixed plate and a floating hinge connected to the base member. The retaining apparatus also includes a pivotable plate member pivotally connected to the hinge. The pivotable plate member also defines a second protrusion engaging an opposing edge of the fixed plate. The pivotable plate member actuates to clamp the fixed plate between the first protrusion and the second protrusion.

According to additional aspects of this disclosure, a retaining apparatus is disclosed that includes a base member arranged to hook an edge of a fixed plate and a pivot member coupled to the base member arranged to hook an opposing edge of the fixed plate. The pivot member defines a release position such that the retaining apparatus is disengaged from the fixed plate. The pivot member also defines a secured position such that a relative distance between hooks of the base member and the pivot member is reduced causing a compressive force across opposing edges of the fixed plate to secure the retaining apparatus.

According to further aspects of this disclosure, a vehicle is provided that includes a cargo area having a fixed plate affixed to a panel. The vehicle also includes a retaining apparatus adapted to removably secure to the fixed plate. The retaining apparatus includes a base member having a first hook adapted to engage an edge of the fixed plate and a hinge connected to the base member. The retaining apparatus also includes a pivotable plate member pivotally connected to the hinge and defining a second hook to engage an opposing edge of the fixed plate. The pivotable plate member is adapted to reduce a distance between the first and second hooks to clinch opposing edges of the fixed plate when actuated to clamp the fixed plate.

BRIEF DESCRIPTION OF THE DRAWINGS

FIG. 4 is a cross section through the retaining apparatus of FIG. 3 along line 4-4 in a secured position.

FIG. 5 is a cross section through the retaining apparatus of FIG. 3 along line 4-4 in a released position.

FIG. 6 is a cross section through a locking member along line 6-6 of FIG. 3 according to an embodiment.

FIG. 7 is a cross section through a locking member along line 6-6 of FIG. 3 according to an alternative embodiment.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
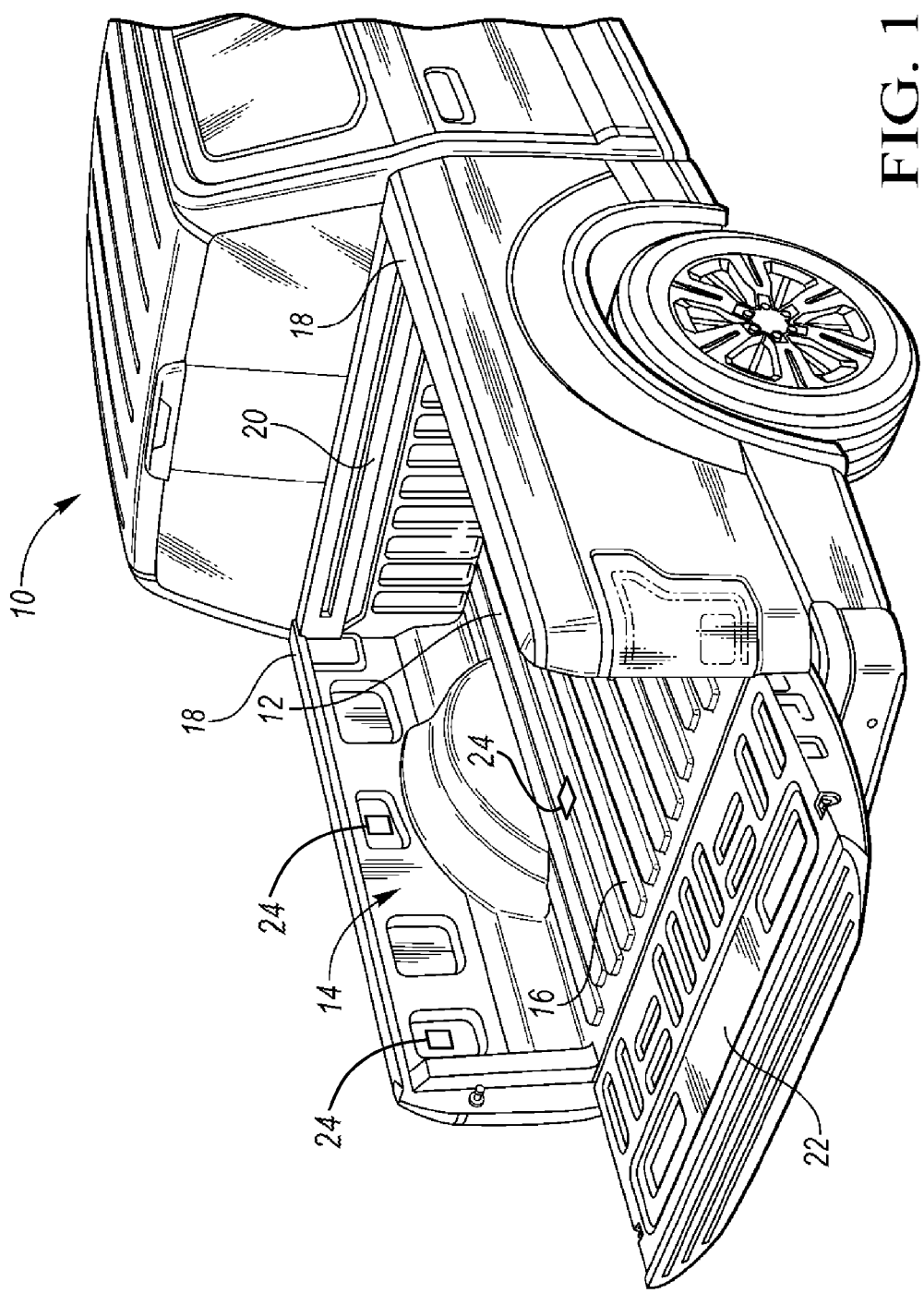
FIG. 1 is a perspective view of a vehicle cargo bed.

Referring to FIG. 1, a vehicle 10 includes a cargo bed 12 having a plurality of panels joined to define a cargo area 14. A floor panel 16 is disposed beneath the cargo area to support cargo items from beneath. A pair of opposing side walls 18 extends vertically from the floor panel 16 to retain cargo laterally within the cargo area. A headboard panel 20 extends vertically from the front edge of the floor panel 16 to retain cargo at a forward portion of the cargo area 14. A rotating tailgate 22 is pivotally attached to the floor panel 16 at a rear portion and is shown in FIG. 1 at an open horizontal position allowing a user to easily place cargo within the cargo area 14. The tailgate 22 is capable of being rotated upward to latch in a vertical closed position to retain cargo at the rear portion of the cargo area 14.

In order to enhance the cargo carrying capability of the cargo bed 12, the overall size of the cargo area 14 is maximized to account for a range of different cargo types. Therefore cargo types which are smaller than the overall size of the cargo area may not occupy the entire space of the cargo area 14. It may be undesirable to allow such smaller cargo to shift within the cargo bed during transit.

It may be desirable to tie down cargo at different locations within the cargo bed 12 during transit based on the size and shape of the particular cargo. A plurality of fixed plates 24 may be affixed to the various panels of the cargo bed 12 to provide a number of different securing points for different cargo. In at least one embodiment, standard-sized fixed plates 24 are provided at several locations on one or more of the floor panel 16, side walls 18, headboard panel 20, and tailgate 22. In alternative embodiments, the fixed plate 24 may be an elongate track having a number of different secure points along its length.

Figure 2:
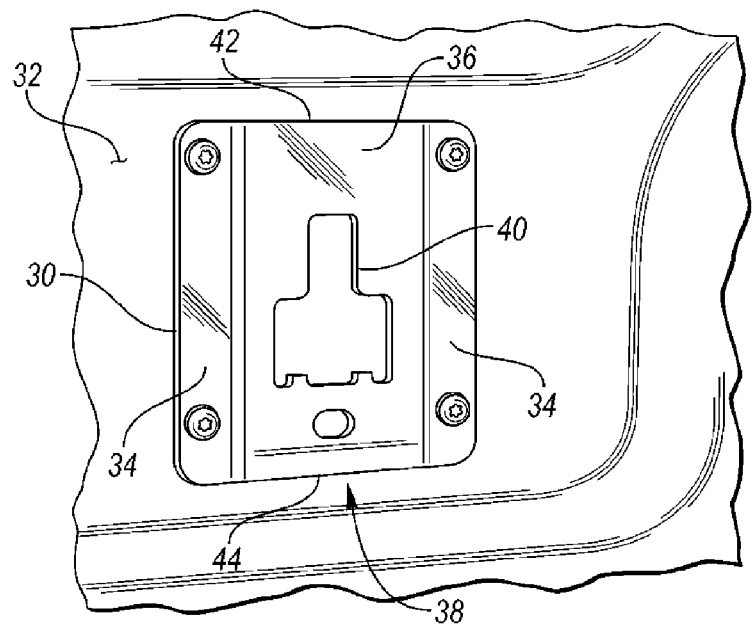
FIG. 2 is a perspective view of a standard interface fixed plate.

Referring to FIG. 2, an example of a standard-sized fixed plate 30 is depicted. As discussed above, each of a number of fixed plates may define standard dimensions to accommodate modular connections using interchangeable components. In the example of FIG. 2, the fixed plate 30 is secured to a vertical wall 32, for example such as a side wall 18, of the cargo bed 12. The fixed plate 30 includes a pair of opposing mounting flanges 34 that are secured to the vertical wall 32. An offset section 36 is provided between, and interconnects the opposing mounting flanges 34. The offset section 36 is positioned at a distance away from the vertical wall 32 to provide a gap 38. In this way, a number of different devices can be mechanically retained to the offset section 36 by extending into the gap 38 and engaging a back surface of the offset section 36. In one example, a hole 40 is provided near a center portion of the offset section. The hole 40 may be shaped to receive a locking feature from an interfacing component to retain to the fixed plate 30. In other examples, an interfacing component may be secured to an upper edge 42 and/or a lower edge 44 of the fixed plate 30.

Figure 3:
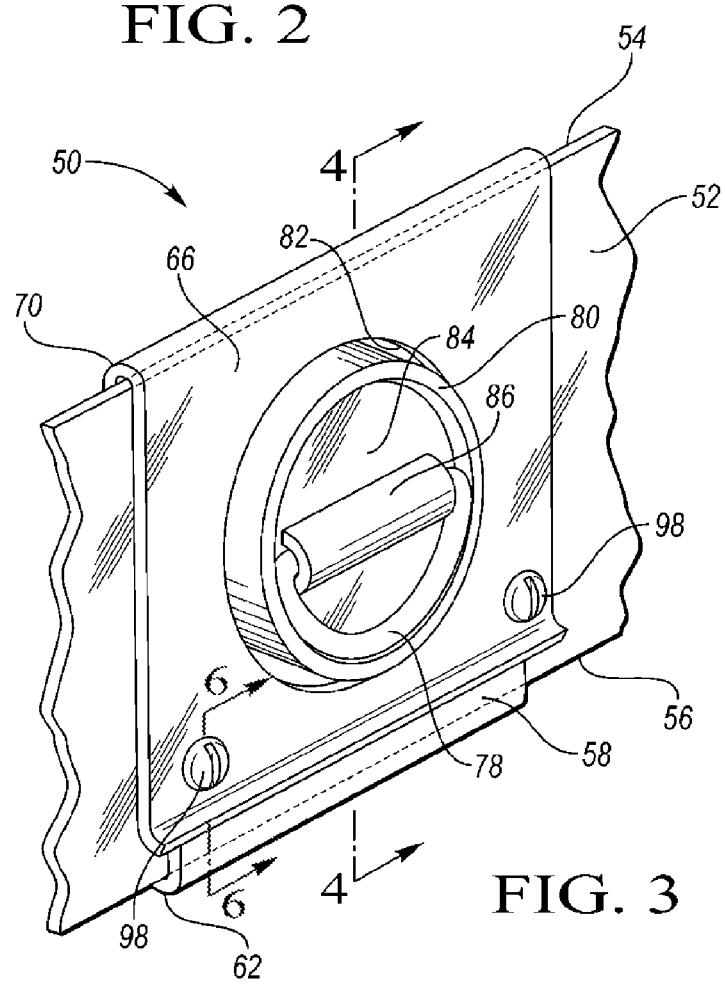
FIG. 3 is a perspective view of removable retaining apparatus.

Referring to FIGS. 3 through 5, a removable retaining apparatus 50 is depicted according to aspects of the present disclosure. A fragmentary portion of a fixed plate 52 is depicted for supporting the retaining apparatus 50. As discussed above the fixed plate 52 may include a standard interface shape and be mounted at a number of different locations and orientations within the cargo bed. The portion of the fixed plate 52 depicted in FIG. 3 may represent the offset section of a standard sized fixed plate as discussed above. Alternatively, the fixed plate 52 depicted in FIG. 3 may represent a portion of an elongate track along which the retaining apparatus 50 may be secured in various user-selected locations. The retaining apparatus 50 is configured to be secured to an upper edge 54 and a lower edge 56 of the fixed plate 52.

A base member 58 rests substantially flat against the fixed plate 52. The base member 58 includes a substantially flat main portion 60 and a protrusion 62 extending from a lower portion. In the example provided, the protrusion 62 is a hooking flange that wraps around the lower edge 56 of the fixed plate 52. The hook-shaped protrusion 62 engages a back surface 64 of the fixed plate 52. It should be appreciated that other protrusion shapes may be suitable to engage features of the fixed plate 52. For example a bayonet-shaped protrusion may be inserted into an internal feature of the fixed plate 52 at an oblique angle to secure the position of the base member 58 relative to the fixed plate 52.

The retaining apparatus 50 includes a pivotable plate member 66 to secure the opposite portion of the retaining apparatus 50 to the fixed plate 52. The pivotable plate member 66 is pivotally connected to base member 58 by a hinge 68 that allows relative rotation between the pivotable plate member 66 and the base member 58. The pivotable plate 66 also includes a protrusion 70 to engage the fixed plate 52 at a location opposite from the location of the protrusion 62 of the base member 58. In at least one embodiment, the protrusion 70 of the pivotable plate 66 is a hooking flange that is shaped to engage the opposing upper edge 54 of the fixed plate 52.

FIGS. 4 and 5 are cross sections along line 4-4 of FIG. 3. As shown in FIG. 5, the pivotable plate member 66 defines a released position where the protrusion 70 is disengaged from the fixed plate 52. In comparison, as shown in FIG. 4, the pivotable plate 66 also defines a secured position where the protrusion 70 of the pivotable plate 66 and the protrusion 62 of the base member 58 each engage opposing portions of the fixed plate 52. As the pivotable plate 66 is actuated from the released position to the secured position, a distance between the protrusion 70 of the pivotable plate 66 and the protrusion 62 of the base member 58 is reduced. The reduction in distance cases a compressive force upon the fixed plate 52 across the portions engaged by the protrusions. In this way, the pivotable plate member actuates to clamp the fixed plate between the protrusions. In at least one embodiment, the retaining apparatus is secured to the fixed plate by a compressive clamping force applied to both of the upper edge 54 and the lower edge 56 of the fixed plate 52. The compressive force operates to secure the retaining apparatus to the fixed plate for the tying down of cargo.

In at least one embodiment the hinge 68 is a floating hinge that causes the change in distance between the protrusion 62 of the base member 58 and the protrusion 70 of the pivotable plate 66 as the pivotable plate is actuated. The floating hinge is provided with a hinge link 72 having a first pivot 74 at one end, and a second pivot 76 at an opposing end. The first pivot 74 of the hinge link 72 is coupled to the base member 58 and defines a first hinge axis. The second pivot 76 of the hinge link 72 is coupled to the pivotable plate 66 and defines a second hinge axis. As the pivotable plate 66 is actuated, the second axis is shifted relative to the first axis causing the change in the distance between the protrusions of the base member 58 and the pivotable plate 66 as discussed above. In response to actuation of the pivotable plate, the hinge link 72 operates a cam and shifts the direction of motion of the pivotable plate 66 into relative translation between the protrusions to clamp the opposing edges of the fixed plate.

According to an aspect of the present disclosure, a bulge in resistant moment is generated as the pivotable plate is actuated. Once the resistant moment bulge is overcome, the mechanical advantage provided by the cam action of the hinge link 72 reduces the resistive moment. In operation, the pivotable plate 66 is urged towards the secured position once the pivotable plate is actuated beyond a threshold toward the secured position. In at least one embodiment, the bulge occurs about midway through the travel range of the pivotable plate 66. In this way, when the pivotable plate 66 is rotated less than the threshold it is biased toward the release position. Conversely, when the pivotable plate 66 is rotated beyond the threshold, it is biased toward the secured position. Biasing toward the secured position near the closed end helps to prevent inadvertent release of the retaining apparatus 50.

In an opposite respect, as the pivotable plate 66 is actuated from the secured position to the released position, the relative distance between the protrusion 62 of the base member 58 and the protrusion 70 of the pivotable plate 66 is increased. This causes a reduction in the compressive force upon the fixed plate 52 and allows for an easy release of the retaining apparatus 50.

To facilitate the securing of cargo, the retaining apparatus includes an anchor loop structure, or "bull ring," 78. The anchor loop 78 is coupled to, and is pivotable with respect to the base member 58. In at least one embodiment, base member 58 includes a crowned portion 80 that protrudes through a hole 82 in the pivotable plate 66. The crowned portion 80 includes a recess 84 that allows the anchor loop 78 rotate to a stowed position which is flush within the recess 84. A hinge 86 is disposed within the recess 84 of the crowned portion 80 to allow the anchor loop 78 to freely pivot. The pivoting anchor loop 78 provides a user with a convenient means to tie cargo down with a rope, bungee cord or other securing mechanism.

According to an aspect of the present disclosure, the retaining apparatus 50 covers the securing points at which the fixed plate is secured to the cargo bed. More specifically, the retaining apparatus 50 blocks tool access to the securing points of the fixed plate when the pivotable plate 60 is in the secured position. The fixed plate may be bolted or otherwise fastened to the cargo bed and require a tool for removal. The configuration of the retaining apparatus which blocks tool access to the fixed plate enhances security by deterring theft of the retaining apparatus and/or cargo which may be tied down to the anchor loop.

FIG. 6 is a cross section along line 6-6 of FIG. 3 that shows a locking feature to hold the pivotable plate 66 in the secured position. In at least one embodiment, the locking feature is a rotating lock post 90 disposed near an edge of the pivotable plate 66 opposite the hinge 68. The rotating lock post 90 includes a tab 92 extending laterally from a distal end of the post. The tab 92 operates as a keyed feature when aligned with a corresponding keyway 94 through the fixed plate 52. As the pivotable plate 66 is actuated to the secure position, the lock post 90 protrudes through both of the base member 58 and the keyway 94 of the fixed plate 52. Once fully in the secured position, the rotating lock post 90 may be rotated such that the tab 92 becomes misaligned relative to the shape of the keyway 94 of the fixed plate 52. In this way, the tab 92 engages a back surface 64 of the base member and restricts the pivotable plate 66 from moving out of the secured position. The locking feature also includes a head 98 for a user to operate the locking feature. In one example, the head 98 includes a groove for a user to rotate the lock post 90 in the direction of arrow 100 with a simple tool such as a screwdriver. In other examples, a key or uniquely-shaped tool is required to operate the locking feature to enhance security. Although the tab is shown as protruding through both of the base member 58 and the fixed plate 52 to engage the back surface 64, it is envisioned that the lock post 90 could alternatively be shortened such that the post protrudes only through the base member 58, and tab 92 engages a back surface of the base member 58.

FIG. 7 is another cross section along line 6-6 of FIG. 3 depicting an alternative embodiment of a locking feature disposed on the base member 58. When the pivotable plate 66 is in the secure position, a fixed tab 102 may extend from the flat portion 60 of the base member 58 through an opening 104 in the pivotable plate 66 at a location opposite the hinge. The fixed tab 102 includes a through-hole 106 to receive a lock, post, or other fixing object to engage a front surface of the pivotable plate 66. When a fixing object is inserted through the through-hole 106 the pivotable plate 66 is held in the secure position.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A retaining apparatus comprising:
   a base having a first protrusion engaging an edge of a fixed plate;
   a hinge connected to the base;
   a pivotable plate connected to the hinge, defining a second protrusion engaging an opposing edge of the fixed plate, wherein the pivotable plate clamps the fixed plate between the first and second protrusions; and
   a lock disposed on the pivotable plate to restrict clamping of the pivotable plate relative to the base.

2. The retaining apparatus of claim 1 wherein the pivotable plate defines an opening and the base includes an anchor loop protruding through the opening.

3. The retaining apparatus of claim 2 wherein the pivotable plate defines a hole and the base includes a crowned portion protruding through the hole, and the anchor loop is pivotably coupled to the crowned portion.

4. The retaining apparatus of claim 1 wherein the hinge includes a hinge link having a first pivot coupled to the base and a second pivot coupled to the pivotable plate, and the first pivot reverses position relative to the second pivot when the pivotable plate is actuated.

5. The retaining apparatus of claim 1 wherein at least one of the first protrusion and the second protrusion is a hooking flange that wraps around an edge of the fixed plate.

6. The retaining apparatus of claim 1 wherein the lock comprises a rotating lock post and a tab coupled to the pivotable plate, the lock post configured to cooperate with a keyway on the fixed plate.

7. A retaining apparatus comprising:
   a base member arranged to hook an edge of a fixed plate;
   a pivot member coupled to the base member arranged to hook an opposing edge of the fixed plate, wherein the pivot member defines a release position such that the retaining apparatus is disengaged from the fixed plate and a secured position such that a relative distance between hooks of the base member and the pivot member is reduced causing a compressive force across opposing edges of the fixed plate to secure the retaining apparatus; and
   a lock disposed on one of the base member and the pivot member, the lock configured to hold the pivot member in the secured position.

8. The retaining apparatus of claim 7 further comprising a hinge link operatively coupling the pivot member to the base member, wherein the hinge link defining a first hinge axis on the base member and a second hinge axis on the pivot member, and the second axis is shifted relative to the first axis when the pivot member is actuated from the release position to the secured position.

9. The retaining apparatus of claim 7 further comprising a hinge link pivotally coupled to each of the base member and the pivot member, wherein in response to actuation of the pivot member to the secured position the hinge link operates as a cam to translate the pivot member relative to the base member to clinch the fixed plate.

10. The retaining apparatus of claim 7 wherein the lock includes a rotating lock post in cooperation with a keyway on the base member.

11. The retaining apparatus of claim 7 wherein the pivot member defines an opening and the base member includes a retention ring protruding through the opening.

12. A vehicle comprising:
   a cargo area having a fixed plate affixed to a panel; and
   a retaining apparatus adapted to removably secure to the fixed plate, the retaining apparatus comprising:
      a base member having a first hook adapted to engage an edge of the fixed plate;
      a hinge connected to the base member,
      a pivotable plate member pivotally connected to the hinge and defining a second hook to engage an opposing edge of the fixed plate, wherein the pivotable plate member is adapted to reduce a distance between the first and second hooks to clinch opposing edges of the fixed plate when actuated; and
      a lock disposed on one of the pivotable plate member and the base member the lock adapted to restrict pivoting of the pivotable plate member relative to the base member.

13. The vehicle of claim 12 wherein the fixed plate includes a mounting flange and an offset section, and the retaining apparatus is adapted to clinch opposing edges of the offset section.

14. The vehicle of claim 12 wherein the fixed plate is an elongate track and the retaining apparatus is configured to secure to a user-selected location along a length of the elongate track.

15. The vehicle of claim 12 wherein the pivotable plate member defines an opening in a center portion and the base member includes a retention ring disposed protruding through the opening in the pivotable plate member.

16. The vehicle of claim 15 wherein the base member includes a crowned portion protruding through the opening in the pivotable plate member, and the retention ring is pivotably coupled to the crowned portion.

17. The vehicle of claim 12 wherein the hinge is a floating hinge having two pivots that reverse position relative to each other when the pivotable plate member is actuated.

* * * * *